(12) United States Patent
Wang et al.

(10) Patent No.: US 8,057,945 B2
(45) Date of Patent: Nov. 15, 2011

(54) SOLID OXIDE FUEL CELL WITH RECYCLED CORE OUTLET PRODUCTS

(75) Inventors: Hung-Yu Wang, Zhonghe (TW); Chien-Hsiung Lee, Longtan Shiang (TW); Yu-Ching Tsai, Pingtung County (TW); Wen-Tang Hong, Nantou County (TW); Wei-Ping Huang, Longtan Shiang (TW)

(73) Assignee: Atomic Energy Council-Institute of Nuclear Energy Research, Lungtan, Taoyuan (TW)

( * ) Notice: Subject to any disclaimer, the term of this patent is extended or adjusted under 35 U.S.C. 154(b) by 0 days.

(21) Appl. No.: 11/976,443

(22) Filed: Oct. 24, 2007

(65) Prior Publication Data
US 2010/0261073 A1 Oct. 14, 2010

(51) Int. Cl.
*H01M 8/04* (2006.01)
*H01M 8/06* (2006.01)

(52) U.S. Cl. ......... 429/433; 429/423; 429/413; 429/436

(58) Field of Classification Search .................. 429/408, 429/413–416, 423–425, 433–436, 440, 441
See application file for complete search history.

(56) References Cited

U.S. PATENT DOCUMENTS

| | | | |
|---|---|---|---|
| 6,641,625 B1* | 11/2003 | Clawson et al. | 48/127.9 |
| 2002/0004152 A1* | 1/2002 | Clawson et al. | 429/17 |
| 2002/0114988 A1* | 8/2002 | Iwasaki et al. | 429/34 |
| 2005/0074644 A1* | 4/2005 | Ueda et al. | 429/22 |
| 2005/0112429 A1* | 5/2005 | Collins et al. | 429/26 |
| 2006/0127714 A1* | 6/2006 | Vik et al. | 429/19 |
| 2006/0248799 A1* | 11/2006 | Bandhauer et al. | 48/189.2 |
| 2008/0057359 A1* | 3/2008 | Venkataraman et al. | 429/13 |

* cited by examiner

*Primary Examiner* — Barbara Gilliam
*Assistant Examiner* — Edu E Enin-Okut
(74) *Attorney, Agent, or Firm* — Jackson IPG PLLC; Demian K. Jackson

(57) ABSTRACT

A solid oxide fuel cell includes a core with an anode inlet, an anode outlet, a cathode inlet and a cathode outlet. A first heater is connected to the anode inlet of the core. A second heater is connected to the cathode inlet of the core. A reformer is connected to the first heater. A heat exchanger is connected to the second heater. A burner is connected to the reformer and the anode and cathode outlets of the core. A humidifier is connected to the reformer. A first gas supply is connected to the humidifier. A second gas supply is connected to the reformer. A third gas supply is connected to the burner. A fourth gas supply is connected to the heat exchanger.

7 Claims, 3 Drawing Sheets

SOLID OXIDE FUEL CELL WITH RECYCLED CORE OUTLET PRODUCTS

BACKGROUND OF INVENTION

1. Field of Invention

The present invention relates to a solid oxide fuel cell and, more particularly, to a solid oxide fuel cell that requires a limited amount of external energy.

2. Related Prior Art

Referring to FIG. 3, a conventional solid oxide fuel cell includes a core 20, a first heater 21 connected to the core 20, a reformer 22 connected to the first heater 21, a first heat exchanger 23 connected to the reformer 22, a burner 24 connected to the first heat exchanger 23 and the core 20, a second heater 25 connected to the core 20, a second heat exchanger 26 connected to the second heater 25 and the burner 24, a fuel supply 27 connected to the first heat exchanger 23, a liquid supply 28 connected to the first heat exchanger 23 and an gas supply 29 connected to the second heat exchanger 26. The core 20 includes an anode inlet, an anode outlet, a cathode inlet and a cathode outlet although not shown. The fuel supply 27 includes a fuel reservoir 271 and a flow controller 272. The liquid supply 28 includes a liquid reservoir 281, a pump 282 and a third heat exchanger 283. The gas supply 29 includes an air reservoir 291 and a flow controller 292.

Fuel is provided to the first heat exchanger 23 from the fuel supply 27 while water is provided to the first heat exchanger 23 from the liquid supply 28. The fuel and water are pre-heated in the first heat exchanger 23. Then, the fuel and water are transferred to the reformer 22 in which they are reformed. The reformed fuel is transferred to the first heater 21 in which it is heated. The reformed fuel is transferred to the core 20 through the anode inlet. Fresh air is provided to the second heat exchanger 26 from the gas supply 29. The fresh air is pre-heated in the second heat exchanger 26. Then, the fresh air is transferred to the second heater 25 in which it is heated. The fresh air is finally transferred into the core 20 through the cathode inlet. Incompletely burned fuel is transferred to the burner 24 from the core 20 through the anode outlet. The incompletely burned fuel is burned in the burner 24. Used air is transferred to the first heat exchanger 23 from the core 20 through the cathode outlet. The used air is pre-heated in the burner 24. Then, the used air is transferred to the burner 24 to help the combustion of the incompletely burned fuel. In the core 20, chemical reactions occur, thus generating electricity.

The first heater 21, the second heater 25 and the third heater 283 are heat tapes that require a lot of external energy for heating. Therefore, the efficiency of the conventional solid oxide fuel cell is low.

The present invention is therefore intended to obviate or at least alleviate the problems encountered in prior art.

SUMMARY OF INVENTION

The primary objective of the present invention is to provide a solid oxide fuel cell that requires a limited amount of external energy.

To achieve the primary objective of the present invention, the solid oxide fuel cell includes a core with an anode inlet, an anode outlet, a cathode inlet and a cathode outlet. A first heater is connected to the anode inlet of the core. A second heater is connected to the cathode inlet of the core. A reformer is connected to the first heater. A heat exchanger is connected to the second heater. A burner is connected to the reformer and the anode and cathode outlets of the core. A humidifier is connected to the reformer. A first gas supply is connected to the humidifier. A second gas supply is connected to the reformer. A third gas supply is connected to the burner. A fourth gas supply is connected to the heat exchanger.

Other objectives, advantages and features of the present invention will become apparent from the following detailed description referring to the attached drawings.

BRIEF DESCRIPTION OF DRAWINGS

The present invention will be described via detailed illustration of the preferred embodiment referring to the drawings.

DETAILED DESCRIPTION OF PREFERRED EMBODIMENT

Figure 1:
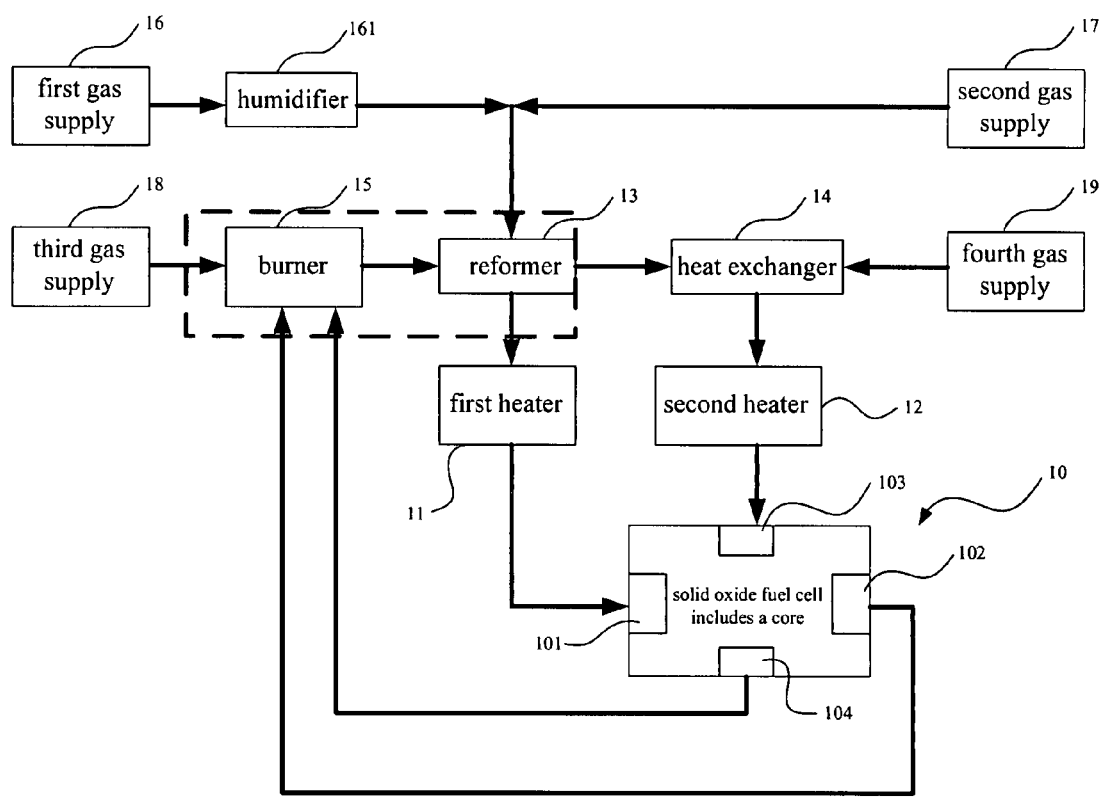
FIG. 1 is a block diagram of a solid oxide fuel cell according to the preferred embodiment of the present invention.

Referring to FIG. 1, a solid oxide fuel cell includes a core 10, a first heater 11, a second heater 12, a reformer 13, a heat exchanger 14, a burner 15, a first gas supply 16, a second gas supply 17, a third gas supply 18 and a fourth gas supply 19 according to the preferred embodiment of the present invention. The solid oxide fuel cell requires a limited amount of external energy.

Figure 2:
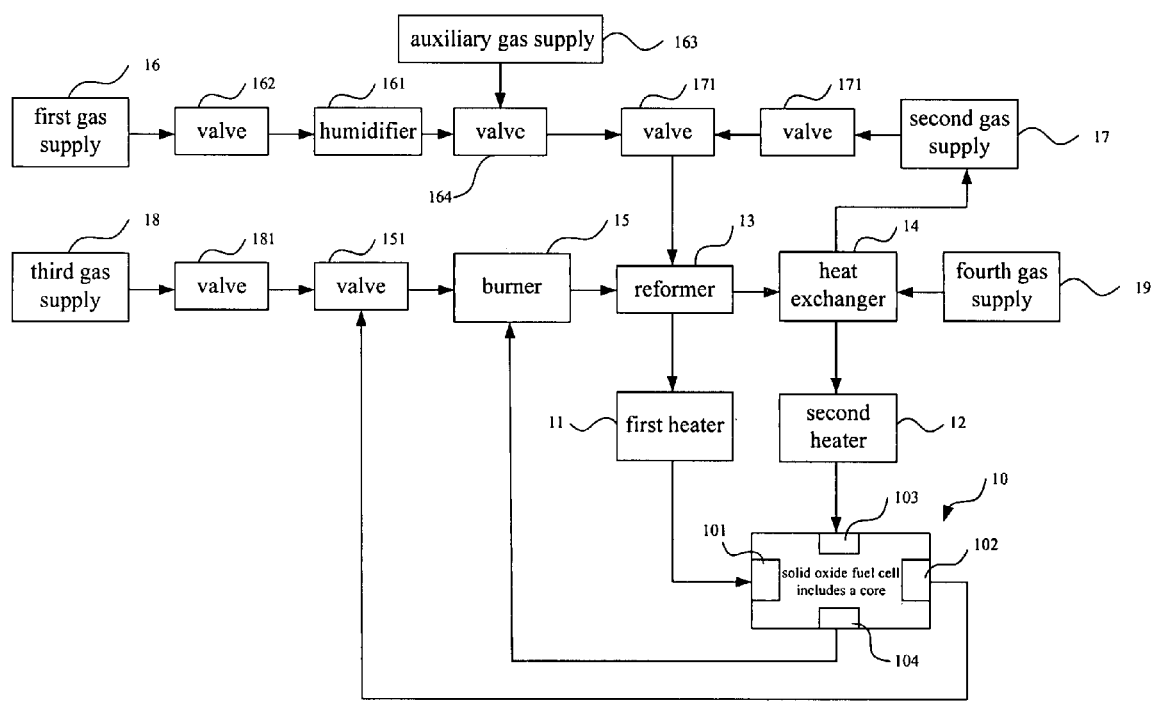
FIG. 2 is a more detailed block diagram of the solid oxide fuel cell shown in FIG. 1.
Figure 3:
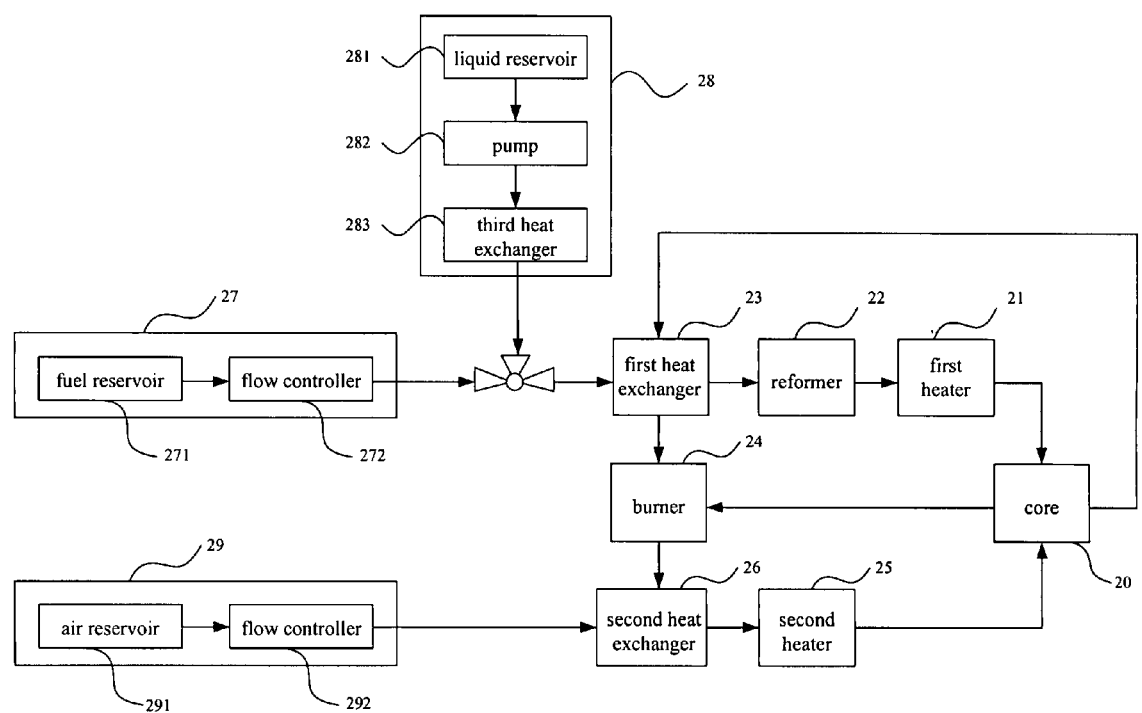
FIG. 3 is a block diagram of a conventional solid oxide fuel cell.

Referring to FIG. 2, the core 10 includes an anode inlet 101, an anode outlet 102, a cathode inlet 103 and a cathode outlet 104. In the core 10, chemical reactions occur, thus generating electricity.

The first heater 11 is connected to the anode inlet 101 of the core 10. Air is pre-heated in the first heater 11 and then transferred to the core 10 through the anode inlet 101.

The reformer 13 is connected to the first heater 11. In the reformer 13, high-concentration hydrogen is produced via reforming natural gas, alcohol, gasoline and diesel. The high concentration hydrogen is transferred to the first heater 11.

The second heater 12 is connected to the cathode inlet 103 of the core 10.

Other air is pre-heated in the second heater 12 and then transferred to the core 10 through the cathode inlet 103.

The heat exchanger 14 is connected to the second heater 12 and the reformer 13. The reformer 13 transfers exhausted heat to the heat exchanger 14 to heat air and steam to increase the efficiency of the solid oxide fuel cell. Then, the air and steam are transferred to the second heater 12.

The burner 15 is connected to the reformer 13, the anode outlet 102 of the core 10 and the cathode outlet 104 of the core 10. A valve 151 is provided between the burner 15 and the anode outlet 102 of the core 10. Incompletely burned fuel is transferred to the burner 15 from the core 10 through the anode outlet 102 and the cathode outlet 104. The incompletely burned fuel is burned in the burner 15, thus raising the temperature for increasing the recoverable thermal energy and therefore the efficiency of the solid oxide fuel cell. The burner 15 may be integrated with the heat exchanger 14 in a module.

A valve 172 is connected to the reformer 13. A valve 164 is connected to the valve 172. A humidifier 161 is connected to the valve 164. An auxiliary gas supply 163 is also connected to the valve 164. A valve 162 is connected to the humidifier 161. The first gas supply 16 is connected to the valve 162. Hydrogen and nitrogen are provided from the first gas supply 16. The humidifier 161 increases the humidity in the solid oxide fuel cell. Air is provided from the auxiliary gas supply 163.

A valve 171 is also connected to the valve 172. The second gas supply 17 is connected to the valve 172. Natural gas, alcohol, gasoline, diesel and water are provided to the reformer 13 from the second gas supply 17.

A valve 181 is also connected to the valve 151. The third gas supply 18 is connected to the valve 181. Natural gas, alcohol, gasoline, diesel and air are provided to the burner 15 from the third gas supply 18.

The fourth gas supply 19 is connected to the heat exchanger 14.

Natural gas, alcohol, gasoline, diesel and air are mixed with one another at a proper proportion in the third gas supply 18. The mixture is supplied under the control of the valve 181. The mixture is heated in the burner 15. The burner 15 is connected to the reformer 13 since the latter requires the highest operative temperature among all of the elements.

Hydrogen may be used as fuel. In this case, the hydrogen is transferred from the first gas supply 16 to the core 10 through the anode inlet 101. The hydrogen is not processed in the reformer 13. The hydrogen is heated in the first heater 11 before it is transferred to the core 10.

Alternatively, natural gas, alcohol, gasoline and diesel may be used as fuel. In this case, the natural gas, alcohol, gasoline and diesel are mixed with one another in the second gas supply 17 and then transferred to the reformer 13. The mixture is reformed into high-concentration hydrogen in the reformer 13 and then transferred to the core 10 through the anode inlet 101. In the core 10, the high-concentration hydrogen reacts, thus generating electricity.

In either case, the reaction of the fuel can receive help from air supplied from the auxiliary gas supply 163 under the control of the valve 164.

Oxygen is needed at the cathode inlet 103 of the core 10. To this end, air is supplied to the heat exchanger 14 from the fourth gas supply 19. Since the operative temperature of the reformer 13 is high, this air is pre-heated in the heat exchanger 14 and heated in the heater 12 to a desired temperature before it is transferred to the core 10 through the cathode inlet 103.

Incompletely burned fuel is transferred to the burner 15 from the core 10 through the anode outlet 102 and cathode outlet 104, and burned there. The hot gas transferred through the cathode outlet 104 of the core 10 provides heat that the burner 15 needs. Residual heat is transferred to the heat exchanger 14 for heating the air supplied from the fourth gas supply 19. If needed, the first heater 11 heats the high-concentration hydrogen and/or the second heater 12 heats the air supplied from the fourth gas supply 19.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A solid oxide fuel cell comprising:
    a core comprising an anode inlet, an anode outlet, a cathode inlet and a cathode outlet;
    a first heater connected to the anode inlet of the core;
    a second heater connected to the cathode inlet of the core;
    a reformer connected to the first heater;
    a heat exchanger connected to the second heater and the reformer;
    a burner connected to the reformer and the anode and cathode outlets of the core wherein incompletely burned fuel from the core is transferred from the core to the burner and burned in the burner so as to increase recoverable thermal energy;
    a humidifier connected to the reformer so as to increase humidity in the solid oxide fuel cell;
    an auxiliary gas supply between the humidifier and the reformer and providing air;
    a first gas supply connected to the humidifier and supplying hydrogen and nitrogen to the anode inlet;
    a second gas supply connected to the reformer and supplying natural gas, alcohol, gasoline, diesel and water;
    a third gas supply connected to the burner and supplying natural gas, alcohol, gasoline, diesel and air; and
    a fourth gas supply connected to the heat exchanger and supplying air.

2. The solid oxide fuel cell according to claim 1 comprising a valve between the burner and the anode outlet of the core.

3. The solid oxide fuel cell according to claim 1 comprising a valve between the auxiliary gas supply and the reformer.

4. The solid oxide fuel cell according to claim 1 comprising a valve between the first gas supply and the humidifier.

5. The solid oxide fuel cell according to claim 1 comprising a valve between the second gas supply and the reformer.

6. The solid oxide fuel cell according to claim 1 comprising a valve between the third gas supply and the burner.

7. The solid oxide fuel cell according to claim 1, wherein the reformer and the burner are integrated with each other in a module.

* * * * *